United States Patent Office 3,597,473
Patented Aug. 3, 1971

3,597,473
METHOD OF PURIFYING ETHYLENEGLYCOL METHACRYLATE
Richard Chromecek, Otto Wichterle, Iva Gavrilova, and Jiri Vacik, Prague, Czechoslovakia, assignors to Cesko- slovenska Akademie ved, Prague, Czechoslovakia
No Drawing. Filed May 14, 1968, Ser. No. 728,890
Claims priority, application Czechoslovakia, May 18, 1967, 3,603/67
Int. Cl. C07c 69/54
U.S. Cl. 260—486R                      5 Claims

ABSTRACT OF THE DISCLOSURE

If ethyleneglycol monomethacrylate is contaminated with ethyleneglycol dimethacrylate, the diester can be removed largely by crystallization of the monoester from a normally liquid solvent medium at a temperature below the melting point of the diester, typically −20° to −50° C. If the crude material contains much ethyleneglycol, the esters may be separated from the glycol by dissolving the mixture in water and salting the esters out as an organic phase which may be further purified by distillation or by low-temperature crystallization.

---

This invention relates to the purification of crude ethyleneglycol monomethacrylate, and particularly to the separation of the monomethacrylate from the accompanying corresponding diester and from accompanying ethylene glycol.

Ethyleneglycol monomethacrylate is prepared by transesterification of methylmethacrylate with ethyleneglycol or from methacrylic acid and ethylene oxide. In either case, the monoester is accompanied by amounts of the corresponding dimethacrylate which are undesirable in many applications. It has been proposed in Pat. No. 3,162,677 to remove the diester by extraction of an aqueous solution of the crude material with hydrocarbon solvents. The extraction method is time-consuming and rather costly when a monoester containing less than one percent of the diester is to be produced, as is necessary in some applications.

It has now been found that the diester content of crude ethyleneglycol monomethacrylate can be reduced from 5 percent or more to less than one percent in a single step by dissolving the crude material in an inert, liquid, organic solvent medium whose melting point is substantially lower than that of ethyleneglycol monomethacrylate, cooling the solution to a temperature intermediate the two melting points, and inducing crystallization of the monoester.

The concentration of the ethyleneglycol monomethacrylate in the solution prior to cooling must, of course, be greater than the solubility limit at the lower temperature. The crystallized material is separated from the liquor, and contains less of the diester than the starting material if the diester was initially present as a contaminant in a minor amount, that is, an amount significantly smaller than the amount of the monoester. The method is effective with all organic solvents which meet the above requirements and with diester concentrations as high as 25 percent.

A suitable solvent system may consist of one or more of the common organic solvents such as ethyl ether, acetone, benzene, toluene, xylene, ethyl acetate, chloroform, dichloroethane, and the normally liquid alkanes and their mixtures, such as hexane, petroleum ether, or ligroin, due regard being given to the melting point of the system. The desired improvement is achieved even when the diester is less soluble in the solvent medium than the monoester, but best yields are achieved in a solvent system in which the monoester is relatively poorly soluble and the diester very soluble.

The monoester is more readily soluble than the diester in benzene, toluene, xylene, ethyl acetate, chloroform and dichloroethane. The normally liquid alkanes are better solvents for the diester than for the monoester. Representatives of the two groups may be mixed as needed to achieve the desired separation by low-temperature crystallization.

The cooled, supersaturated solutions do not precipitate crystals spontaneously within a reasonable time, although crystallization eventually does take place. It is therefore more practical to induce crystallization by means other than by merely waiting. Seeding with a few crystals is preferred, but other known methods, such as scraping the inner wall of a glass container with a glass rod may be resorted to.

The afore-described purification method is directly applicable to the reaction mixtures obtained from methacrylic acid and ethylene oxide after removal of excess reactants, if any. When ethyleneglycol methacrylate is produced by transesterification of methyl methacrylate, the reaction mixture normally may contain more unreacted glycol than esters, and direct crystallization is not practical.

We have found that the glycol can be separated almost entirely from the ethyleneglycol methacrylate by dissolving the mixture in an adequate amount of water and adding enough of an inert electrolyte to the solution for salting out an organic phase containing most of the ester while the glycol remains in the aqueous phase. Additional ester may be recovered from the aqueous liquid by extraction with organic solvents in which glycol is insoluble or relatively sparingly soluble, such as ether or benzene.

In view of the purely physical effect to be produced, the chemical nature of the electrolyte is irrelevant as long as it does not enter into reactions with or promotes polymerization of the highly reactive methacrylate. Sodium chloride is the preferred electrolyte for obvious reasons, but potassium chloride, calcium nitrate, ammonium phosphate and pyrophosphate, the soluble sulfates of the alkali metals, and strongly ionized salts of acetic acid or benzoic acid could equally be employed if so desired.

A major portion of the diester may be removed prior to salting out in a known manner. The diester is relatively poorly soluble in water. It may remain undissolved when the mixture of monoester, diester, and glycol is dispersed in water, and may be removed by filtration. The aqueous solution may also be extracted with solvents to remove the bulk of the diester.

The organic phase obtained by salting-out is practically saturated with water, and is preferably dried by vacuum distillation at low temperature, by azeotropic distillation in the presence of benzene, or by contact with a hygroscopic solid as is conventional. The dry organic phase may then be subjected to low-temperature crystallization for further purification as described above. It is also possible to recover a very pure monoester from the dried liquid by continuous flash distillation in a vacuum. The dwell time of the ester in the distillation zone must be held to a minimum to avoid polymerization.

The following examples are further illustrative of this invention.

EXAMPLE 1

20 g. crude ethyleneglycol monomethacrylate containing 1.03% of the corresponding diester were dissolved in 100 ml. of a 1:9 mixture of hexane and ethyl ether that had been dried over calcium chloride. The solution was cooled to −50° C. and seeded with a crystal of the monoester.

The crystals formed were separated from the mother liquor by filtration on a refrigerated suction filter and washed with a very small amount of the solvent mixture. The refined monoester so obtained weighed 15 g. and contained only 0.40% of the diester.

EXAMPLE 2

100 grams of the same crude monoester were dissolved in 400 ml. of a mixture of equal volumes of a technical grade of hexane containing other hydrocarbons and of ethyl ether. When seeded at −45° C. and worked up as described in the preceding example, the solution yielded 90 g. refined monoester containing 0.28% diester.

50 g. refined monoester containing 0.28% diester were dissolved in 150 ml. ethyl ether dried over calcium chloride, and crystallization was induced by seeding the solution at −45° C. The further purified crop of crystals so obtained contained only 0.13% of the diester, and the diester content was further reduced to 0.09% by repeating the crystallization from dry ether.

EXAMPLE 3

5 g. crude monoester, as described in Example 1, were dissolved in 15 ml. anhydrous acetone. When the solution was cooled to −45° C. and seeded, a refined monoester was precipitated. The material recovered by centrifuging on a refrigerated centrifuge weighed 3 g. and contained 0.13% diester.

EXAMPLE 4

100 g. crude monoester containing 1.03% diester were suspended in 250 ml. petroleum ether boiling between 30° and 50° C. Enough ethyl ether (69 ml.) was added to the suspension at ambient temperature to dissolve the suspended material, and the solution was cooled to −30° C. The crystals formed and recovered as described above weighed 94 g. and contained only 0.31% of the diester. When the crystallization procedure was repeated, a monoester containing 0.18% diester was obtained.

EXAMPLE 5

150 ml. toluene dried over calcium chloride were used for dissolving 50 g. crude monoester as described above. Crystallization of a purified product was induced by seeding at −45° C., and the recovered material was further refined by repeating the same procedure. The material ultimately recovered weighed 30 g. and contained 0.14% diester.

EXAMPLE 6

Methyl methacrylate was transesterified with ethyleneglycol in the presence of sodium methylate in a conventional manner. The partly worked-up reaction mixture weighed 1395 g. and contained 5.2% ethyleneglycol dimethacrylate, 39.8% ethyleneglycol monomethacrylate, the balance essentially consisting of ethylene glycol.

The mixture was almost completely dissolved in 5580 ml. water at ambient temperature, undissolved diester was removed, and the clear solution was extracted with five 250 ml. batches of hexane to remove most of the residual diester. The residual aqueous solution was stirred with 3000 g. sodium chloride for two hours, whereby a layer mainly consisting of monoester separated from the heavier aqueous phase. The organic layer was dissolved in 700 ml. ethyl ether, and the aqueous layer was extracted twice with 500 ml. ether.

The combined ether solutions were heated in a vacuum to 30°–40° C. to remove the ether, and most of the water present was distilled off in 30 minutes at 70° C. at 15 torrs. The crude monomer so obtained was subjected to continuous flash distillation at 100°–110° C. and torr, and 441 g. of a distillate containing 97.5% monoester and 0.3% diester were recovered.

EXAMPLE 7

450 g. methyl methacrylate were transesterified with 530 g. diethylene glycol, 10 ml. of 4.5 N solution of sodium methylate in methanol, and 1 g. phenothiazine at 60° C. for 30 minutes. Unreacted methyl methacrylate was distilled off, and the residue weighing 678.5 g. contained 6% ethyleneglycol dimethacrylate and 39% of the corresponding monoester (264 g.). It was diluted with 2714 ml. water, the aqueous mixture was filtered to remove some diester, and the filtrate was extracted with five 200 ml. batches of hexane to remove additional diester.

When 1500 g. sodium chloride were admixed to the aqueous phase, an organic layer mainly consisting of monoester separated, and was dissolved in 500 ml. ethyl ether. The aqueous layer was extracted twice with 500 ml. ether, and the combined ether solutions were evaporated in a vacuum at 30°–40° C. Water was removed from the residue by heating at 70° C. at 15 torrs for 30 minutes.

The crude monomer thereby obtained was subjected to flash distillation at 0.1 torr and 100°–110° C., and 212 g. of a purified distillate were recovered. It contained 97.5% ethyleneglycol monomethacrylate and 0.2% of the corresponding diester.

EXAMPLE 8

A technically pure grade of ethyleneglycol monomethacrylate containing 81.23% monoester, 1.83% diester, balance ethyleneglycol, was dissolved in four volumes of water, and the aqueous solution was extracted with hexane. The monoester was salted out, and the organic layer was further purified as described in Example 6.

The ultimate product contained 0.14% diester and 99.25% monoester.

EXAMPLE 9

A technically pure grade of ethyleneglycol monomethacrylate containing 87.5% monoester, 1.6% diester, and ethyleneglycol was dissolved in water, the aqueous solution was extracted with hexane, and the aqueous residue was saturated with sodium chloride. The organic layer was separated, and the aqueous layer was extracted twice with benzene. The extracts were combined with the previously separated organic layer and subjected to vacuum treatment for 30 minutes at 70° C. as described in Example 7, whereby the benzene and the water present were simultaneously removed. The residue was flash distilled in a vacuum, as described above.

The product obtained contained 99.2% ethyleneglycol monomethacrylate and 0.21% of the corresponding dimethacrylate.

EXAMPLE 10

A technically pure grade of ethyleneglycol monomethacrylate containing 88.6g% of the monoester and 1.10% of the diester together with residual ethyleneglycol was extracted with hexane in aqueous solution, salted out, and taken up in benzene, as described in the preceding example. The vacuum treatment time at 70° C., however, was reduced to 15 minutes prior to flash distillation.

The purified product contained 97.41% monoester, 0.21% diester, and 2.23% residual water, as determined by analysis.

If flash distillation equipment is not available or flash distillation is not desirable, we prefer to separate residual diester from the ethyleneglycol monomethacrylate in the organic phase precipitated by the addition of an electrolyte by crystallization at low temperature. Thus, a very pure ethyleneglycol monomethacrylate is recovered from the combined ether solutions described in Examples 6 and 7 by drying the same over calcium chloride, evaporating the ether in a vacuum, and dissolving the residue in ether or toluene. When the solution is cooled to −40° C., crystallization of an ethyleneglycol monomethacrylate containing less than 0.3% of the diester can be initiated by seeding. The yield is somewhat inferior to that obtained by flash distillation, but the product obtained is of superior purity.

The benzene solutions of Examples 9 and 10 may similarly be worked up by distillation and low-temperature crystallization of a solution of the residue rather than by distillation for a purer product at lower yield if the benzene is replaced by a solvent having a sufficiently low melting point. Pure benzene does not meet the melting point requirements of this invention.

Other modifications and variations in the method of the invention will readily suggest themselves to those skilled in the art since the examples relate only to preferred embodiments.

We claim:

1. A method of recovering crude ethyleneglycol monomethacrylate from a mixture thereof with ethyleneglycol which comprises,
  (a) dispersing said mixture in an amount of water sufficient to dissolve said ethyleneglycol monomethacrylate and said ethyleneglycol;
  (b) adding to the aqueous solution so obtained an amount of an electrolyte inert to said ethyleneglycol monomethacrylate in an amount sufficient to cause formation of a liquid organic phase separate from said solution;
  (c) separating said organic phase from said aqueous solution;
  (d) drying said organic phase;
  (e) dissolving the dried organic phase in an inert organic solvent medium having a melting point substantially lower than the melting point of ethyleneglycol monomethacrylate;
  (f) cooling the solution so obtained to a temperature intermediate the melting points of said medium and of said ethyleneglycol monomethacrylate;
  (g) including crystallization of said ethyleneglycol monomethacrylate from the remainder of said cooled solution,
    the amount of said ethyleneglycol present in the dissolved organic phase being substantially greater than the amount of ethyleneglycol monomethacrylate soluble in said solvent medium at said intermediate temperature; and
  (h) recovering the crystallized ethyleneglycol monomethacrylate from the remainder of said cooled solution.

2. A method as set forth in claim 1, wherein said solvent medium essentially consists of at least one member of the group consisting of ethyl ether, acetone, benzene, toluene, xylene, ethyl acetate, chloroform, dichloroethane, and normally liquid alkanes.

3. A method as set forth in claim 1, wherein said mixture contains an amount of ethyleneglycol dimethacrylate substantially smaller than the amount of said ethyleneglycol monomethacrylate, at least a portion of said ethyleneglycol dimethacrylate being removed from said aqueous solution prior to said adding of said electrolyte.

4. A method as set forth in claim 3, wherein said amount of water is insufficient completely to dissolve said ethyleneglycol dimethacrylate, and the latter is removed from said aqueous solution by filtration.

5. A method as set forth in claim 3, wherein said ethyleneglycol dimethacrylate is removed from said aqueous solution by solvent extraction.

References Cited

UNITED STATES PATENTS 3,162,677  12/1964  Horsley et al. _____ 260—486

FOREIGN PATENTS 851,342  10/1960  Great Britain _____ 260—486

LEWIS GOTTS, Primary Examiner

P. J. KILLOS, Assistant Examiner